United States Patent [19]

Ryan

[11] 4,434,954
[45] Mar. 6, 1984

[54] TAPE TENSIONING APPARATUS

[75] Inventor: Dennis M. Ryan, San Mateo, Calif.

[73] Assignee: Ampex Corporation, Redwood City, Calif.

[21] Appl. No.: 364,732

[22] Filed: Apr. 2, 1982

[51] Int. Cl.³ .................... B65H 59/38; B65H 63/02; G03B 1/04; G11B 15/32
[52] U.S. Cl. ................................... 242/189; 242/75.3
[58] Field of Search .................. 242/75.3, 75.5, 75.51, 242/186, 189, 190; 226/195; 318/6, 7; 360/71, 73, 74.3

[56] References Cited

U.S. PATENT DOCUMENTS 3,405,857 10/1968 Albrecht .............................. 226/195
3,697,016 10/1972 Leifer et al. ......................... 242/189

Primary Examiner—Leonard D. Christian
Attorney, Agent, or Firm—J. D. Talcott; C. M. Carman, Jr.

[57] ABSTRACT

In a magnetic tape transport, a tape tension arm is loaded by three different springs to exert three different tension forces laterally against the tape segment anchored between the supply reel and capstan (or supply reel and takeup reel), and the arm has three correspondingly different positions for "play," "fast-forward" and "rewind" modes of operation. The play position of the arm is sensed to provide a play tension at substantially the full value thereof throughout a wide range including the play position, and each pair of tensioning force transmitting elements is arranged to move conjointly and in substantially the same direction so as to avoid frictional shearing motion therebetween.

9 Claims, 3 Drawing Figures

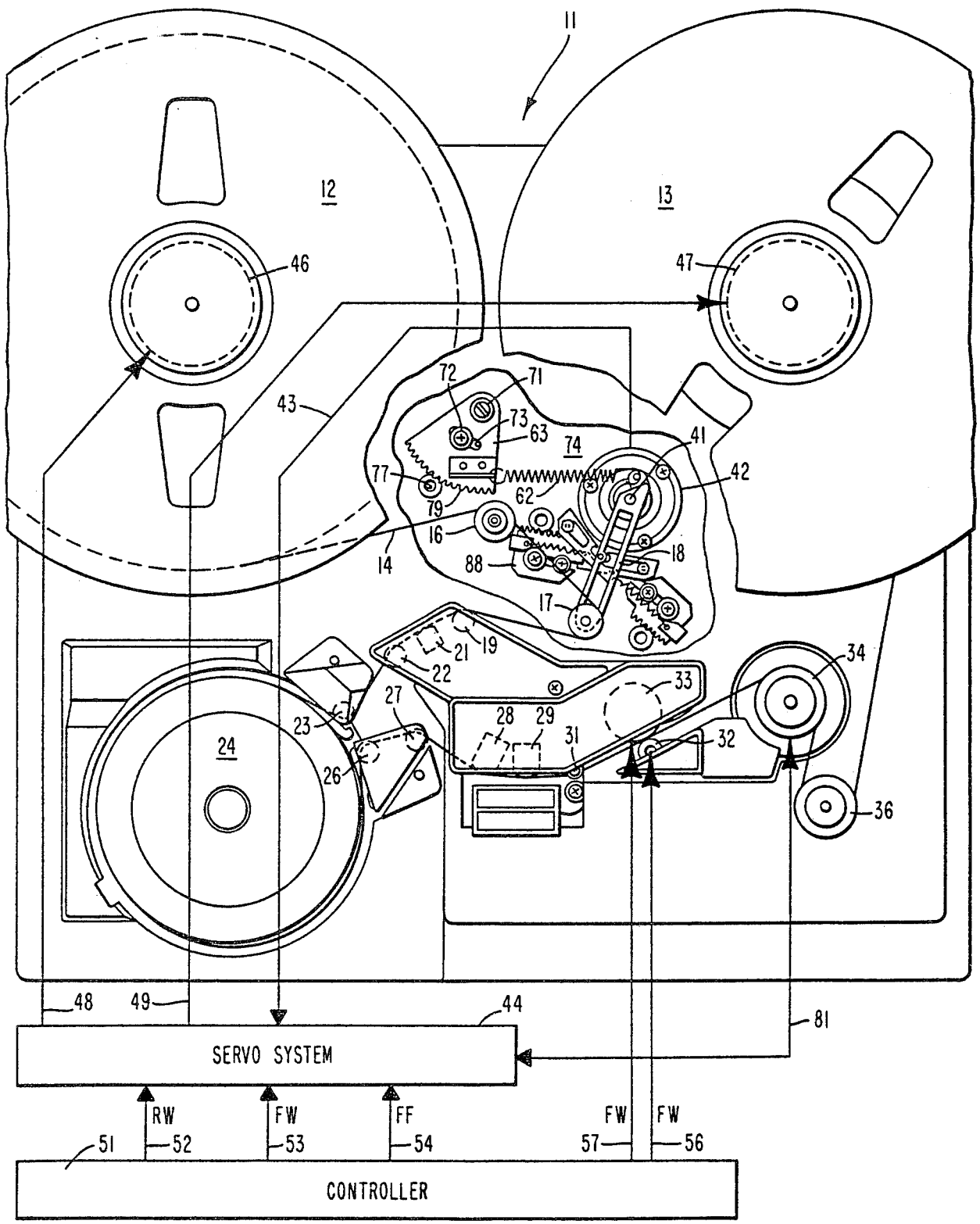
FIG_1

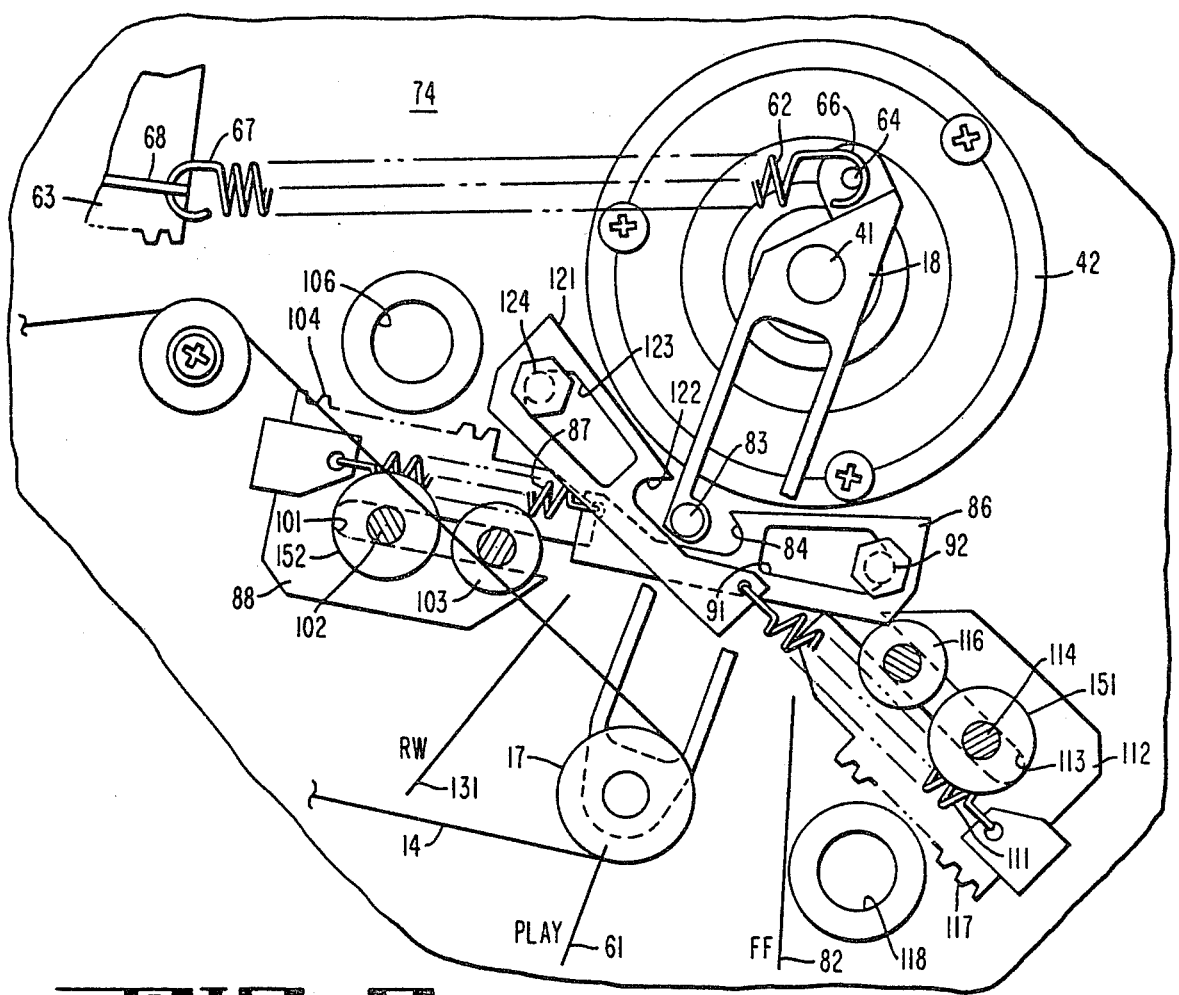
FIG_2
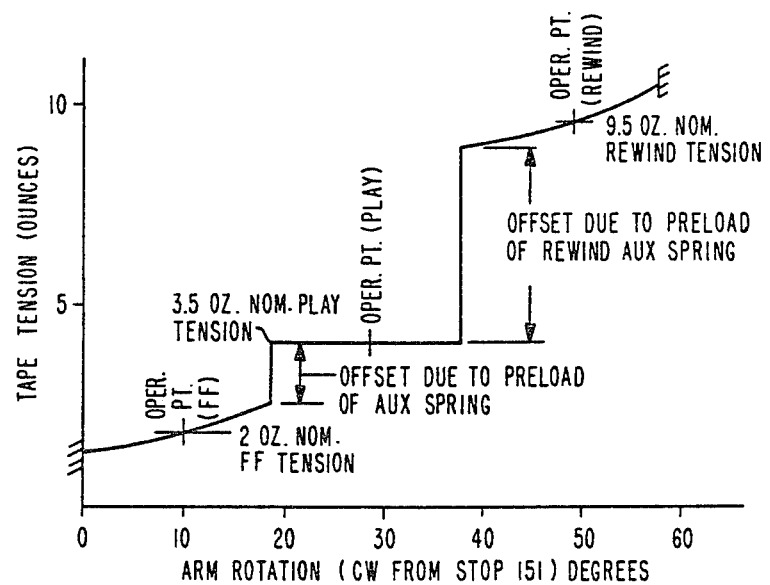
FIG_3

TAPE TENSIONING APPARATUS

BACKGROUND OF THE INVENTION

This invention relates to tape tensioning apparatus and particularly to such apparatus providing different tensions for different modes of transport of the tape.

In the magnetic tape transport art, it is of great importance to maintain the tape tension at a predetermined value during the play and record modes in order to stabilize the actual speed of the tape across the heads. A similar but slightly less rigorous requirement obtains during the fast-forward and fast-rewind modes in order to prevent slack and throwing of the tap or breaking thereof.

To this end, it is common practice to use spring-loaded tension arms engaging the tape segment between tape moving and anchoring means, such as the capstan and supply reel, for play and record modes; or between the two reels, for fast forward or rewind modes. The transport control and servo system determine the length of tape to be maintained between the anchoring means, and the tension arm senses the actual length in accordance with its own rotational displacement, as the tape segment length changes, and signals this information to the control servo system; the system continuously regulates the tape segment length by operating the tape moving and anchoring means until the desired length is achieved. The tension arm thus has a different position for each mode of operation, and as the arm moves from one of these positions to another, a different spring, or set of springs, is brought into play to establish the tension level desired for the corresponding mode.

In such prior art apparatus, however, the spring force is always increased from, or decreased to, a condition of zero distortion of the spring, so that a substantially uniform play-record tension over a broad range of arm positions is impossible to achieve and this all the more so, as the desired fast forward and rewind tension level values depart from the "play-record" tension level values; and widely different levels for the various modes are in fact desirable, for the transport can be designed to operate more effectively when the mode tension levels are not interdependent and do not restrict one another.

Another problem with the prior art is that there is always substantial frictional shearing motion between various pairs of the tension force transmitting elements, and the friction forces involved must be overcome before the apparatus can respond to changes in the conditions or mode commands; in other words, the response sensitivity or resolution of the apparatus is decreased.

Accordingly, it is an object of the present invention to provide discretely different tension levels for different modes of operation of a tape transport, and particularly to provide a substantially uniform tension value in at least one of these mode levels.

It is another object of the invention to substantially eliminate frictional shearing motion between force transmitting elements of a tape transport tape tensioning apparatus.

SUMMARY OF THE INVENTION

In a magnetic tape transport, a tape tension arm is loaded by three different springs to exert three different tension forces laterally against the tape segment anchored between the supply reel and capstan (or supply reel and takeup reel), and the arm has three correspondingly different positions for "play," "fast-forward" and "rewind" modes of operation. The play position of the arm is sensed to provide a play tension at substantially the full value thereof throughout a wide range including the play position, and each pair of tensioning force transmitting elements is arranged to move conjointly and in substantially the same direction so as to avoid frictional shearing motion therebetween.

DESCRIPTION OF THE DRAWINGS

FIG. 1 is a partly schematic illustration including a plan view of a magnetic tape transport with a portion of the top plate broken away to show the apparatus of the invention; and FIG. 2 is an enlarged fragmentary view of a portion of the apparatus shown in FIG. 1; and FIG. 3 is a graph illustrating the operation of the invention.

DESCRIPTION OF THE PREFERRED EMBODIMENTS

Referring now to FIG. 1, there is shown a magnetic tape transport 11 including a forward supply (rewind takeup) reel 12 and a forward takeup (rewind supply) reel 13 upon which is wound a magnetic tape 14 running in forward play-record mode from the supply reel 12 around a guide roller 16, thence around a roller 17 that is mounted at the tip of a pivoting tension arm 18, thence to a guide 19, transducing head 21, guides 22 and 23, a helical tape scanning drum 24, guides 26, 27, heads 28, 29, a guide 31, capstan 32, pinch roller 33, tachometer 34, guide roller 36, and thence to takeup reel 13.

The tension arm 18 is pivotally mounted on the shaft 41 of a rotational-position sensing device 42, which may be of any commercial type known in the art, but is here shown as a photo-potentiometer transmitting a signal schematically illustrated by arrow 43 to a servo system 44, which also may be of any type among many well known in the art, and which functions in a well known manner to regulate the length of the tape segment between reel 12 and capstan 32 (in the play-record mode), or between the two reels 12, 13 in fast forward and rewind modes, as by means of control signals to the respective reel motors 46, 47 illustrated by arrows 48, 49. The mode commands are initiated by a controller 51 which may also be of any well known type, and these command signals are illustrated by arrows 52, 53 and 54 for rewind (RW), play-record modes (i.e., forward, FW), and fast forward (FF). The controller also provides a signal 56 to the capstan 32 and a signal 57 to the pinch roller 33 to operate these elements during the play-record modes only.

To maintain the arm 18 at the desired neutral position 61 for play mode, a helical tension spring 62 is extended from an adjustable mounting bracket 63 to a post 64 on an extending end of arm 18. The attaching coils 67 of the spring are of much greater radius than the attachment flange 68 of the bracket 63, or the pin 64, and upon relative movement between these elements the contact movement is a nearly conjoint tangentially rolling one rather than a frictional shearing one, and frictional sliding resistance to the movement is avoided.

In play operation, the potentiometer senses the rotational position of the arm 18, transmits the position signal 43 to the servo system 44, and the servo transmits the signals 48, 49 and 56, 57 to the reel motors 46, 47 and capstan-pinch-roller assembly 32, 33 to alter the length of the tape segment between reel 12 and capstan 32, so that the arm 18 is pulled by tape 14 to the play position 61. At this position and for a substantial range (e.g., about 10 degrees) on either side, the tape tension established by pin 62 is essentially constant, e.g., about 3.5 oz as shown in FIG. 3.

The desired play tension may be accurately set during operation of the machine by adjustment of the bracket 63, as described in detail in copending application Ser. No. 364,726 filed Apr. 2, 1982 also by the present inventor. Briefly, bracket 63 is mounted for pivoting motion on a pin 71 and clamped in the desired position by means of a bolt 72 projecting through an arcuate slot 73 and threaded into a mounting plate 74 of the machine 11. When bolt 72 is loosened, the bracket may be rotated as by means of a gear toothed tool (not shown) which has a projection fitting into a reference hole 76 in plate 74, and the teeth of which engage an arcuate row of gear teeth 77 on bracket 63.

When it is desired to initiate a fast forward mode, controller 51 sends commands 54, 56, 57, 48 and 49 to the servo 44, and to the capstan, pinch roller and reels, to retract the pinch roller, inactivate the capstan and cause the reels to move the tape forward at high speed under control of the servo; and the actual tape speed is sensed by tachometer 34, which transmits a speed sensing signal 81 to the servo (also in the play and rewind modes). The servo also causes an increased length of tape to be defined in the segment between the reels, so as to permit arm 18 to rotate anti-clockwise toward the fast forward neutral position 82. At about ten degrees from the forward neutral position 82, a roller pin 83 on the arm encounters an arcuate recess 84 in a link member 86 and moves the link member in conjoint motion in substantially the same direction until the potentiometer 42 signals the servo 44 that the arm is in its correct position 82. In this position the arm is loaded not only by spring 62, but also by an opposing auxiliary spring 87 distended between linkage 86 and adjustable bracket 88 mounted on mounting plate 74.

Now it will be noted that recess 84 in link 86 is of slightly greater radius than that of roller pin 83, so that as the pin and link move conjointly in substantially the same (tangential) direction the contact motion between pin and link is substantially frictionless rolling contact.

Also it will be noted that spring 87 in the play mode of the arm 18 is pre-stressed, because the link 86 is mounted as by a slot 91 engaged by a post 92 mounted on mounting plate 74. The slot 91 is very much wider than post 92, so that as the link breaks away from the post under urging by pin 83 of the tension arm, no sliding friction between the post and link results.

When the spring 87 first becomes additionally stressed by pin 83, the result is a sudden (nearly instantaneous) discrete drop in the spring loading of arm 18, since the moment applied by spring 87 is opposed to that of spring 62; and since spring 87 is already pre-stressed by post 92, the slope of the tension-rotation curve for fast forward mode (FIG. 2) can be made to be much steeper than that of the play mode, which is desirable for better servo system operation.

The slope of the fast forward curve (FIG. 3) and the tension level as well, (e.g., 2 oz. nominal) can be set completely independently from the slope and tension level of the play mode, as by carefully choosing the spring rates and relative pre-loads of the springs.

Bracket 88 is a slidingly adjustable bracket provided with a slot 101 fitting on guide and clamping bolts 102, 103, and having auxiliary teeth 104 and a tool positioning reference bore 106.

For rewind mode, a similar spring 111 is preloaded in an aiding direction with respect to spring 62, and is stretched between a sliding adjustable bracket 112 (having associated slot 113, pin 114, bolt 116, teeth 117 and reference bore 118) and a link 121, a mirror image of link 86, (and having a corresponding recess 122, slot 123, and post 124). The spring 111 and link 121 are mounted to add the spring force of spring 111 to that of spring 62, and the resulting action, under commands 52,56 and 57 from controller 51, produces movement of the arm 18 to a rewind position 131, and, as illustrated in FIG. 3, produces a sudden discrete jump in tension to a new tension level, (e.g., 9.5 oz. nominal) for rewind mode, the nominal tension level and the slope of the tension-rotation curve being selectable independently of those parameters for play or fast-forward, as by careful choice of spring rates and pro-load values.

It will be noted that arm 18 is stopped at either end of its rotational range by resiliently padded stop elements 151 and 152.

What is claimed is:

1. A tape tensioning apparatus for a magnetic tape transport including a tape element; a pair of spaced tape moving and anchoring means engaging and anchoring said tape at spaced points thereon defining a tape segment of variable length, and tension loading means coupled to said tape moving and anchoring means and to said tape segment between said spaced points in first and second operating modes to alter the length of said segment between corresponding first and second predetermined length values and to apply corresponding first and second tensioning forces laterally to said segment, characterized in that:

said tension loading means is arranged to apply at least one of said tensioning forces at substantially the full value thereof whenever the actual length value of said segment falls within a predetermined operating range of the corresponding predetermined median length value of the segment; and said tension loading means includes a set including at least one force-transmitting element, said one thereof engaging said tape element and each element of said set engaging at least one other element of said set, each pair of engaged elements being arranged to move only conjointly and in substantially the same direction, so as to avoid frictional shearing motion therebetween.

2. Apparatus as recited in claim 1, wherein said tape moving and anchoring means comprise a pair of tape storage and transport reels.

3. Apparatus as recited in claim 1 wherein said tape moving and anchoring means comprise a tape supply reel and a capstan and pinch roller assembly downstream from said supply reel in the direction of forward longitudinal motion of said tape.

4. Apparatus as recited in claim 1, wherein said tension loading means includes:

a tension arm mounted for pivoting motion on said transport and a first tension spring anchored to said transport and attached to said arm for applying a moment thereto urging said arm laterally against said tape and tensioning said tape between said tape moving and anchoring means;

said arm having a predetermined first rotational alignment position with respect to said transport when said tension loading means is in said first operating mode thereof.

5. Apparatus as recited in claim 4, wherein said tension loading means also includes:
   a second tension spring and a first link member attached at one end to one end of said second spring, the other end of said first link and the other end of said second spring both being anchored to said transport with said second spring tensioned in a preloaded condition;
   said first link being adapted to engage said arm to further tension said second spring when said arm rotates a predetermined arcuate distance away from said first rotational alignment position of said tension loading means, so as to alter the spring load of said arm by an amount corresponding to the load of said second spring;
   said link having a slot formed therein to provide lost motion anchoring of said link to said transport.

6. Apparatus as recited in claim 5, wherein said tension loading means also has a third operating mode and also includes:
   a third tension spring and a second link member attached at one end to one end of said third spring, the other end of said second link and the other end of said third spring both being anchored to said transport with said third spring tensioned in a preloaded condition;
   said second link being adapted to engage said arm to further tension said third spring when said arm rotates a predetermined arcuate distance away from said first rotational alignment position toward a third rotational alignment position corresponding to said third operating mode of said tension loading means, so as to alter the spring load of said arm by an amount corresponding to the load of said third spring;
   said second link also having a slot formed therein to provide lost motion anchoring of said second link to said transport.

7. Apparatus as recited in claim 6, wherein opposite tape tensioning moments are applied by said second and third springs to said arm.

8. Apparatus as recited in either of claim 5 or 7, wherein the anchoring and attachment structures of said springs, and the engagements of said arm and links are each arranged with confronting tension members one of which has an arcuate surface of smaller diameter than the other so that pivoting movement contact therebetween is substantially frictionless rolling movement 9. Apparatus as recited in claim 8, wherein said lost motion anchoring of said links and transport comprise posts extending from said transport and riding freely in slots defined in said links as of substantially greater widths than the diameters of said posts, so that sliding frictional contact between posts and links is wholly avoided.

* * * * *